(12) United States Patent
Hsu

(10) Patent No.: US 9,826,755 B1
(45) Date of Patent: Nov. 28, 2017

(54) ICE CREAM SQUEEZING DEVICE

(71) Applicant: Hsien-Te Hsu, Taoyuan (TW)

(72) Inventor: Hsien-Te Hsu, Taoyuan (TW)

( * ) Notice: Subject to any disclaimer, the term of this patent is extended or adjusted under 35 U.S.C. 154(b) by 0 days.

(21) Appl. No.: 15/218,520

(22) Filed: Jul. 25, 2016

(51) Int. Cl.
*A23G 9/28* (2006.01)

(52) U.S. Cl.
CPC ...................................... *A23G 9/28* (2013.01)

(58) Field of Classification Search
CPC ........... A23G 9/288; A23G 9/283; A23G 9/28
USPC .............................. 222/95, 96, 103; 700/245
See application file for complete search history.

(56) References Cited

U.S. PATENT DOCUMENTS

| | | | | |
|---|---|---|---|---|
| 4,889,210 A | * | 12/1989 | Alcaraz | A23G 9/28 186/38 |
| 2007/0267087 A1 | * | 11/2007 | Jones | A23G 9/22 141/18 |
| 2009/0117242 A1 | * | 5/2009 | Kateman | A23G 9/08 426/474 |
| 2013/0103198 A1 | * | 4/2013 | Nakamoto | B25J 9/161 700/257 |
| 2014/0120235 A1 | * | 5/2014 | Jones | A23G 9/28 426/565 |
| 2017/0071228 A1 | * | 3/2017 | Ferraz Cury | A23G 9/22 |

* cited by examiner

*Primary Examiner* — Donnell Long
(74) *Attorney, Agent, or Firm* — Raymond Y. Chan; David and Raymond Patent Firm

(57) ABSTRACT

An ice cream squeezing device of the invention includes a robot; a storage space accommodating a plurality of packages receiving ice cream; and a squeezing module squeezing a package of ice cream transferred by the robot from the storage space to the squeezing module to move the ice cream out of the package.

10 Claims, 16 Drawing Sheets

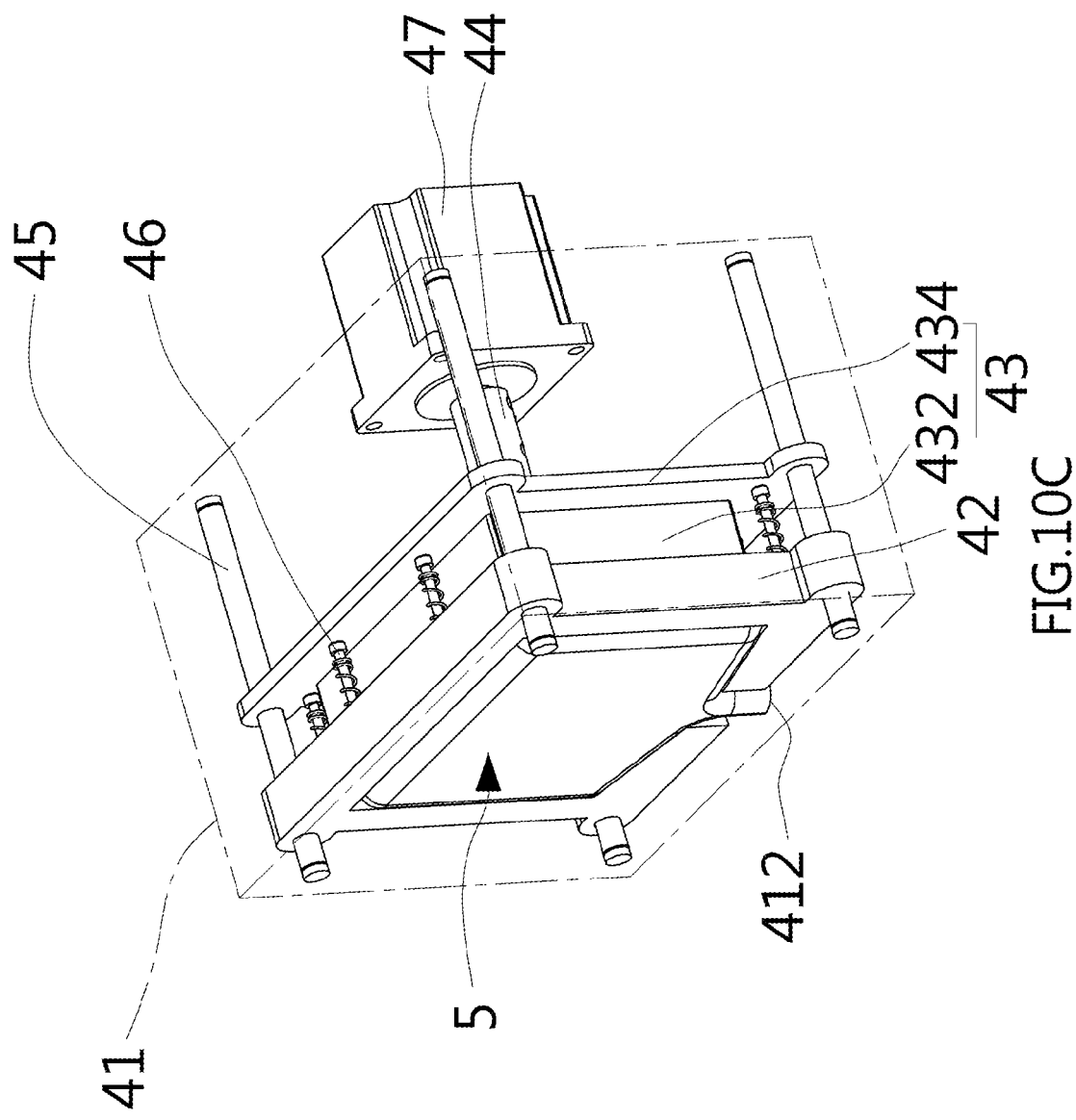

ICE CREAM SQUEEZING DEVICE

BACKGROUND OF THE INVENTION

Field of the Invention

The invention relates to an ice cream squeezing device, and more particularly to an ice cream squeezing device including a robot automatically operating the squeezing process.

Description of the Related Art

In conventional ice cream squeezing devices, a cylindrical can is used to accommodate ice cream. The cylindrical can is placed under the ice cream squeezing device. A user operates the ice cream squeezing device manually to squeeze the cylindrical can, and the ice cream flows out of the cylindrical can and into a cup or a corn.

For such conventional ice cream squeezing devices, the user has to carry the cylindrical can and operate the ice cream squeezing device manually. It is not convenient for the user.

BRIEF SUMMARY OF THE INVENTION

The invention provides an ice cream squeezing device. The ice cream squeezing device in accordance with an exemplary embodiment of the invention includes a robot; a storage space accommodating a plurality of packages receiving ice cream; and a squeezing module squeezing a package of ice cream transferred by the robot from the storage space to the squeezing module to move the ice cream out of the package.

In another exemplary embodiment, the ice cream squeezing device further includes a container module accommodating a plurality of containers, wherein the robot takes a container from the container module to receive the ice cream squeezed out by the squeezing module.

In yet another exemplary embodiment, the ice cream squeezing device further includes a topping module, wherein the robot moves the container filled with the ice cream to the topping module, and the topping module adds toppings to the ice cream.

In another exemplary embodiment, the package includes a main body receiving the ice cream and a flange, and the squeezing module includes: a squeezing chamber having an outlet and an inlet through which the package in transferred to the squeezing chamber; a first squeezing member movably disposed in the squeezing chamber and pressing the flange of the package so as to position the package; and a second squeezing member movably disposed in the squeezing chamber and pressing the main body to squeeze the ice cream out of the package and the squeezing chamber.

In yet another exemplary embodiment, the squeezing module further includes: a push rod moving the first squeezing member and the second squeezing member; a driving device moving the push rod; at least one guiding member guiding the first squeezing member and the second squeezing member when the first squeezing member and the second squeezing member moves in the squeezing chamber; and at least one elastic member disposed between the first squeezing member and the second squeezing member, wherein the first squeezing member is closer to the package than the second squeezing member.

In another exemplary embodiment, the driving device is a motor.

In yet another exemplary embodiment, the first squeezing member is annular and has an inner periphery, and the second squeezing member has a head capable of moving through the first squeezing member.

In another exemplary embodiment, the head has a squeezing surface configured to face the package, and the squeezing surface is an inclined surface.

In yet another exemplary embodiment, the package has an opening, and the first squeezing member has a notch, and the opening corresponds to the notch when the first squeezing member presses the flange.

In another exemplary embodiment, the container module includes a holder holding the container and a button disposed on the holder, a container drops from the holder when the button is pushed.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIGS. 10A-10G are schematic views of a squeezing module of an ice cream squeezing device of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
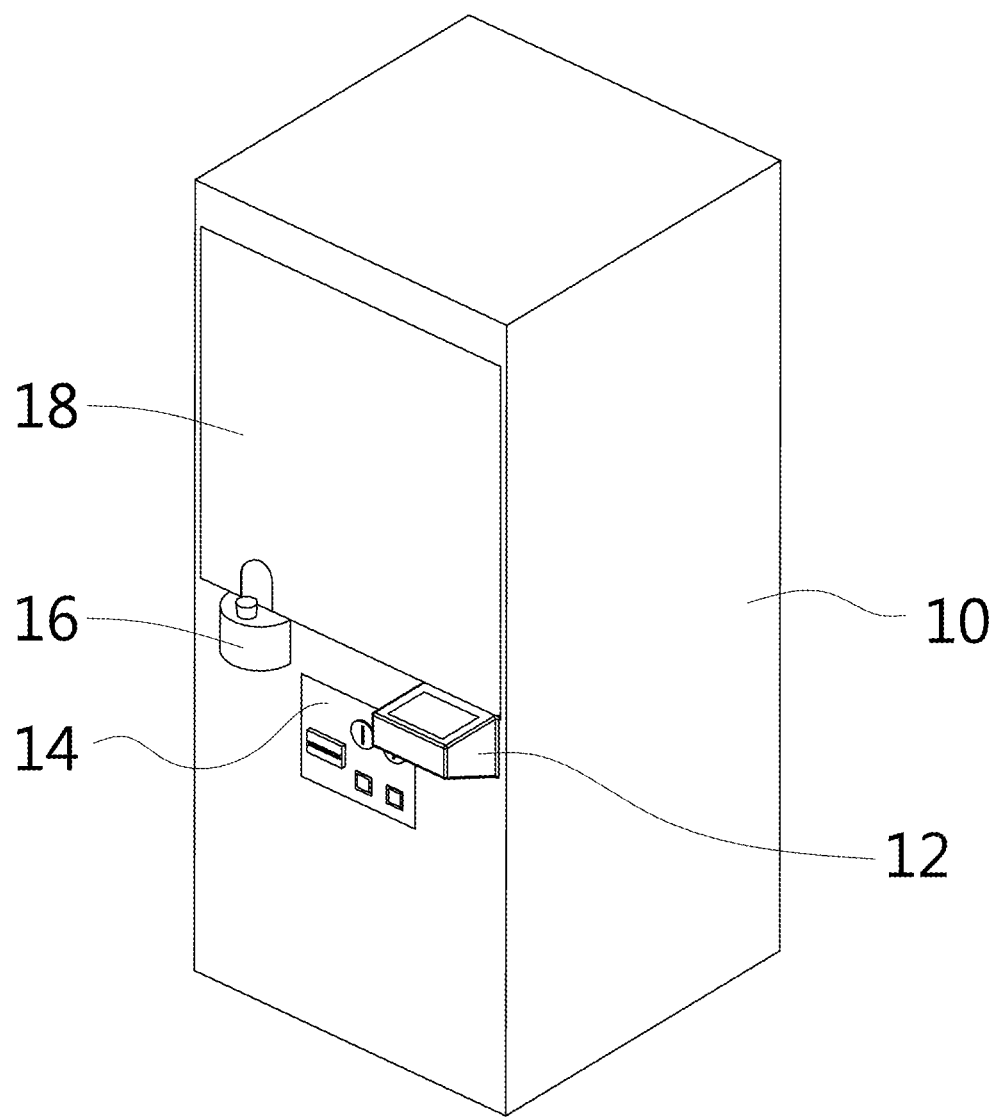
FIG. 1 is a perspective view of an ice cream squeezing device of the invention.
Figure 2:
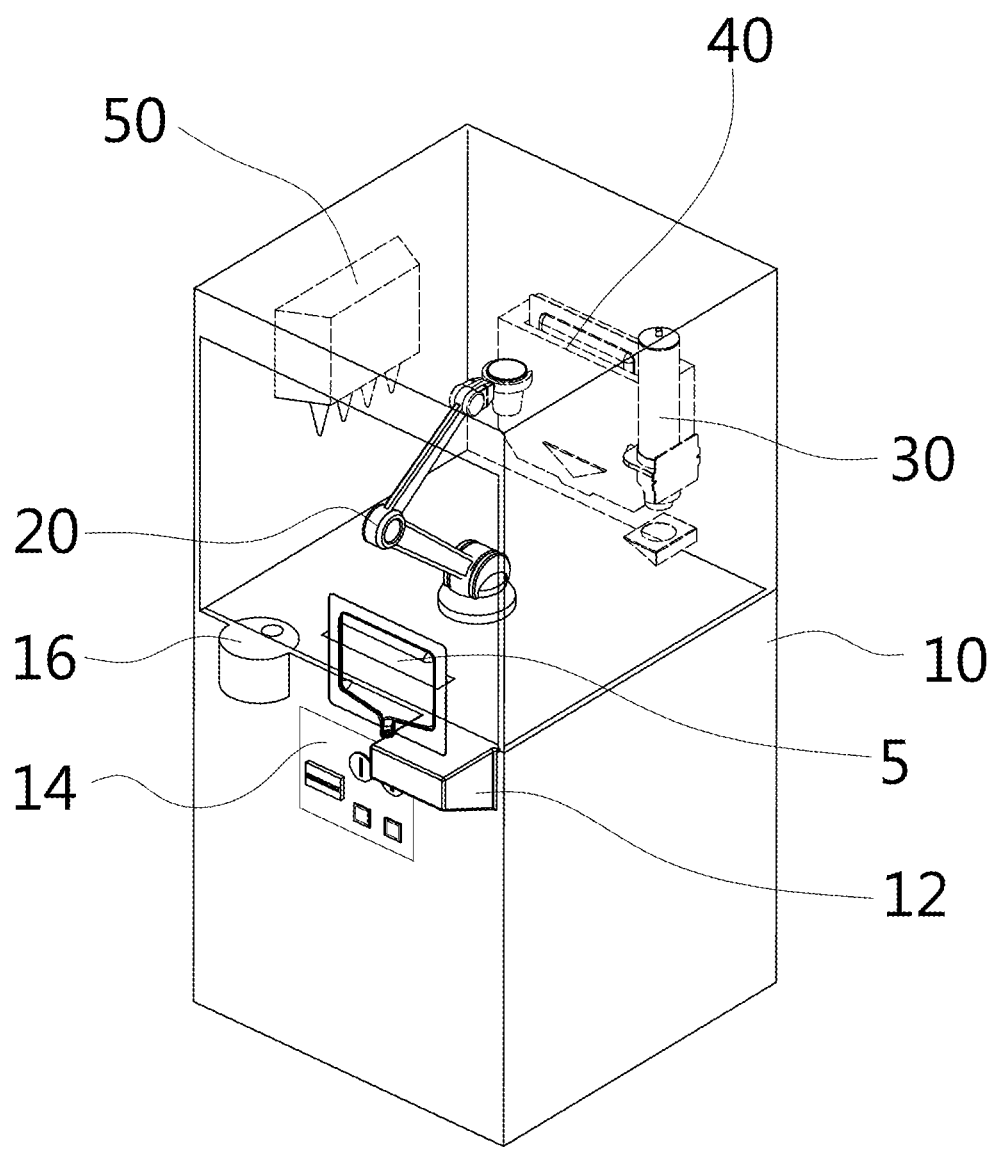
FIG. 2 is another perspective view of an ice cream squeezing device of the invention.

Referring to FIGS. 1 to 2, an ice cream squeezing device of the invention includes a housing 10, a robot 20, a container module 30, a squeezing module 40 and a topping module 50. A storage space is formed in the housing 10. A plurality of packages 5 receiving ice cream are stored in the storage space. An operational panel 12, a coin-feed mechanism 14 and a gate 16 are disposed on an outer surface of the housing 10.

Figure 3:
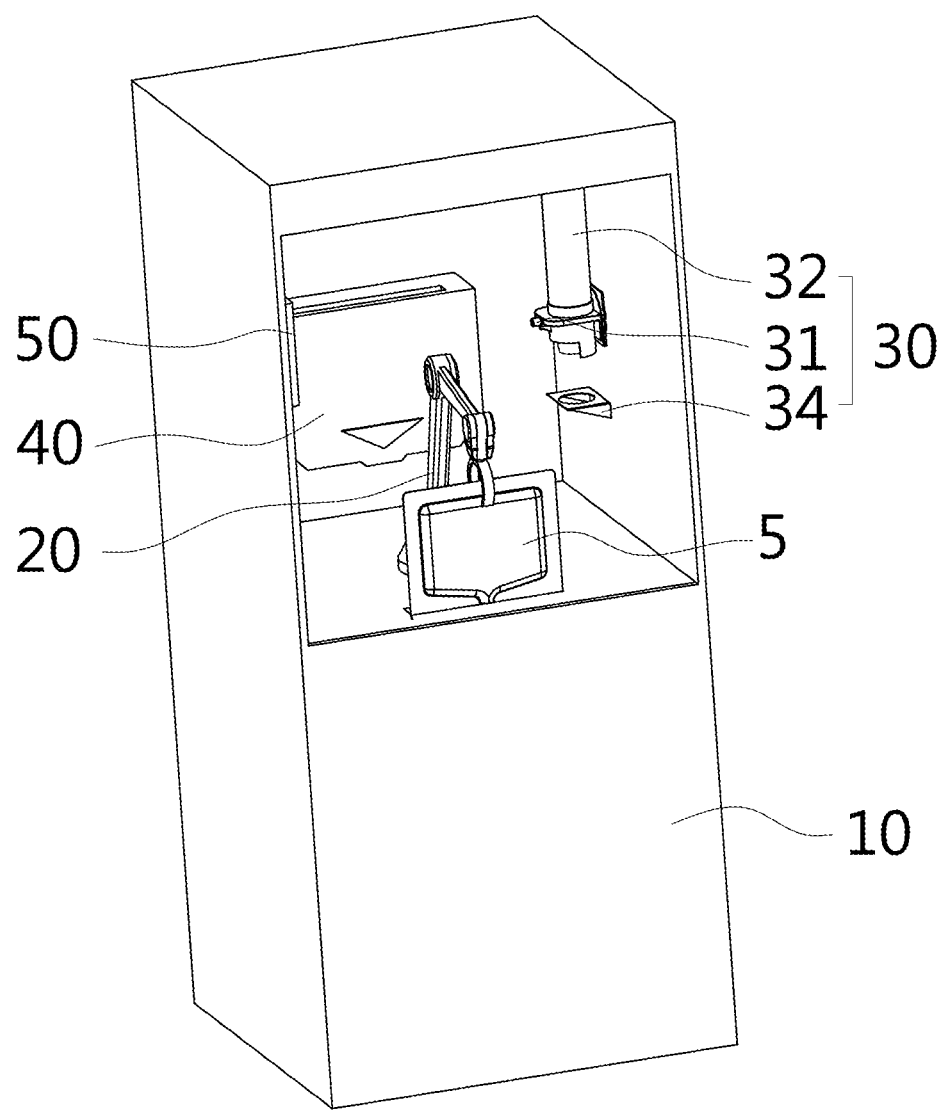
FIGS. 3-9 are schematic views of operation of an ice cream squeezing device of the invention.
Figure 4:
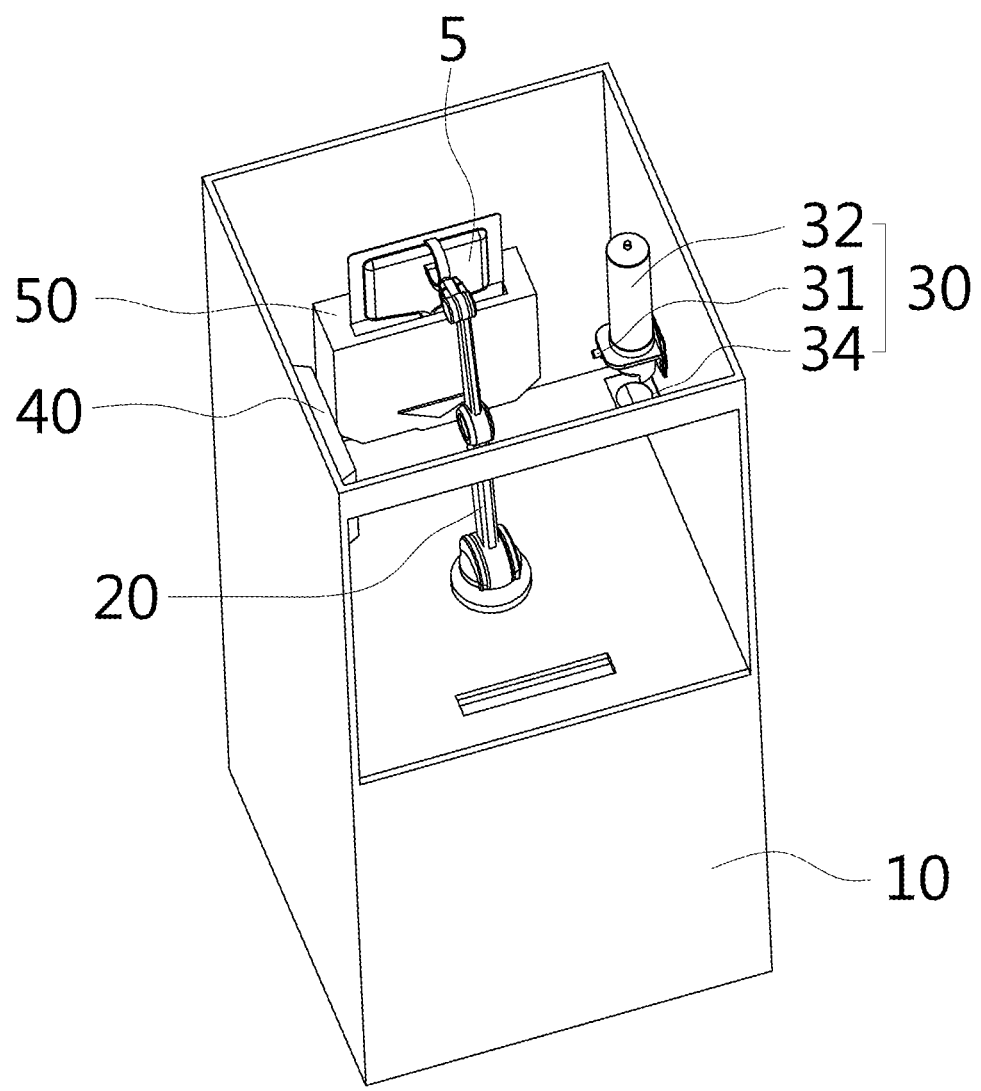
Figure 5:
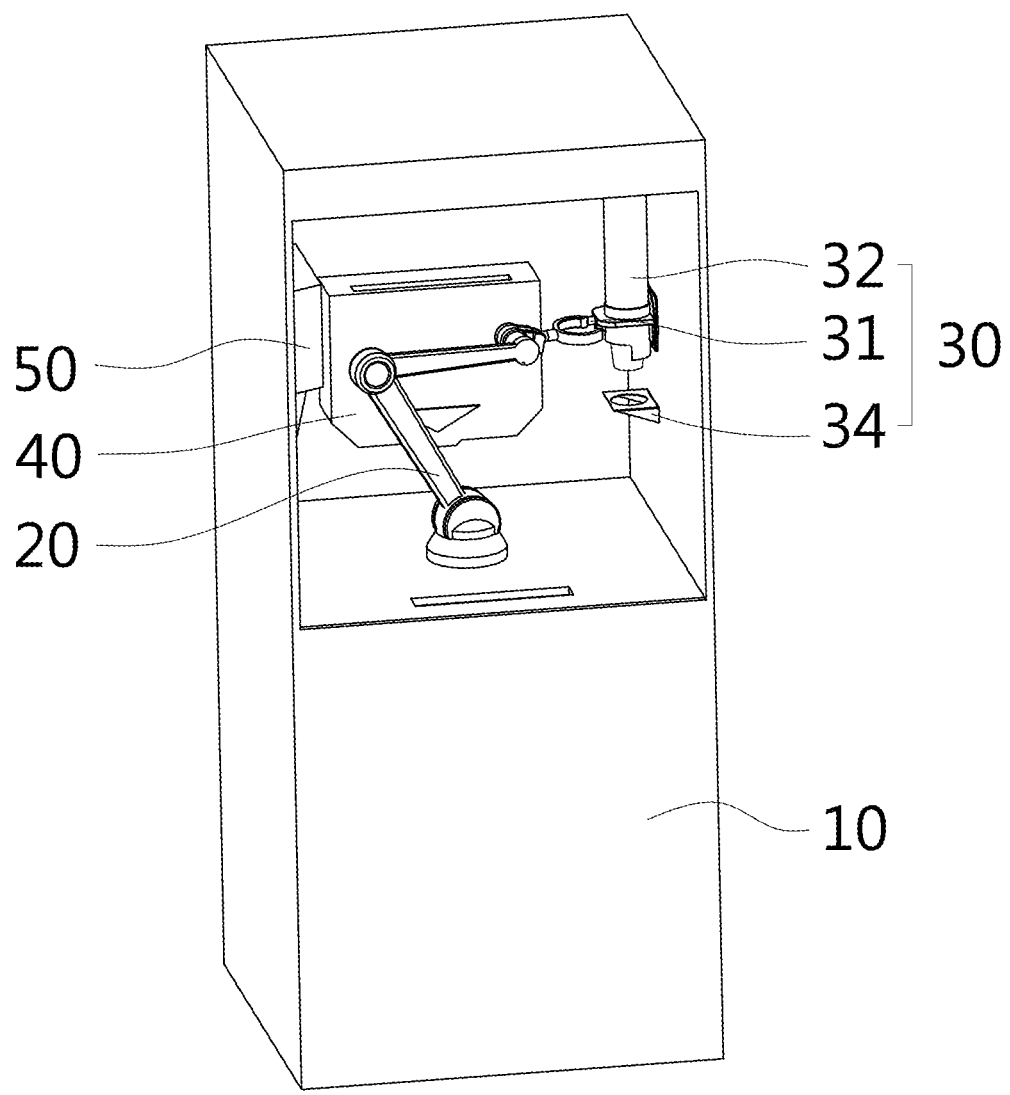
Figure 6:
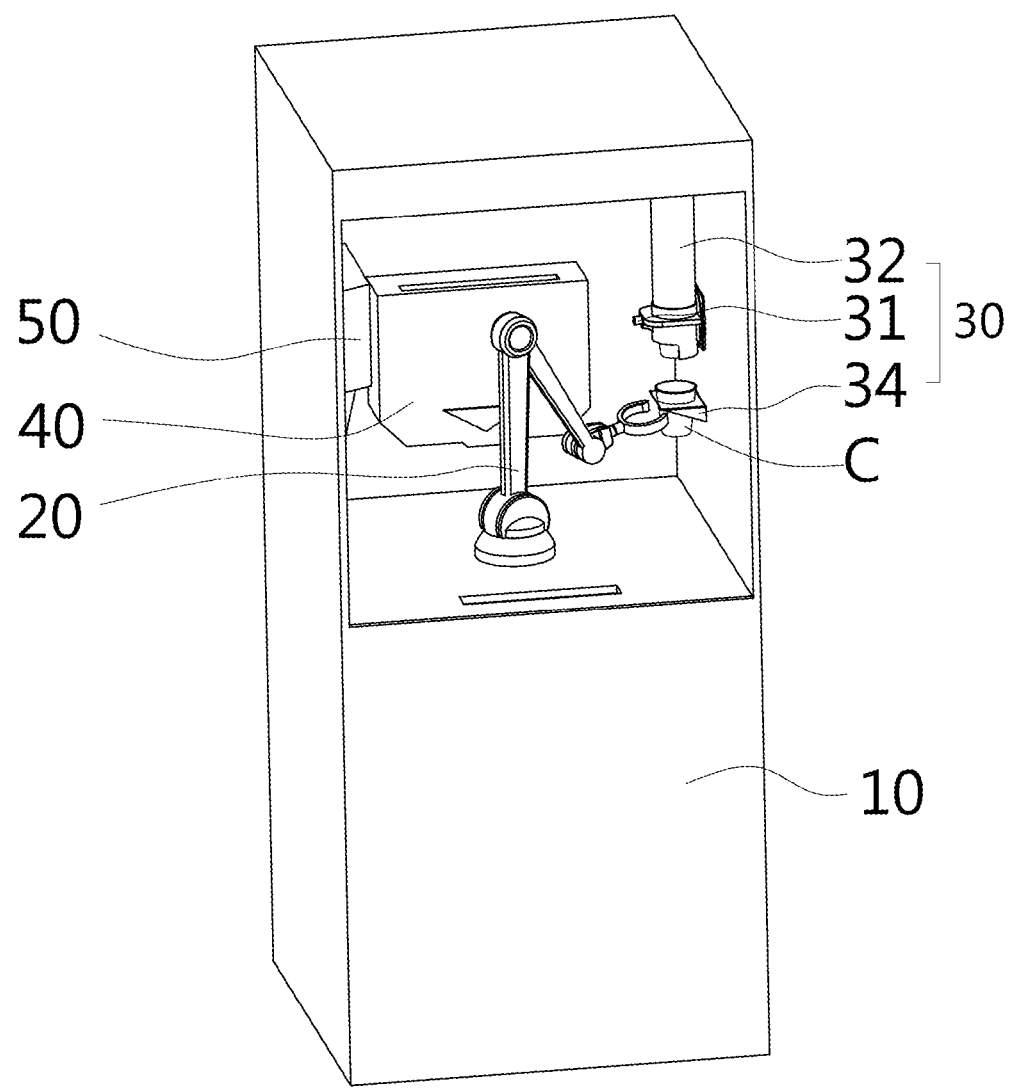
Figure 7:
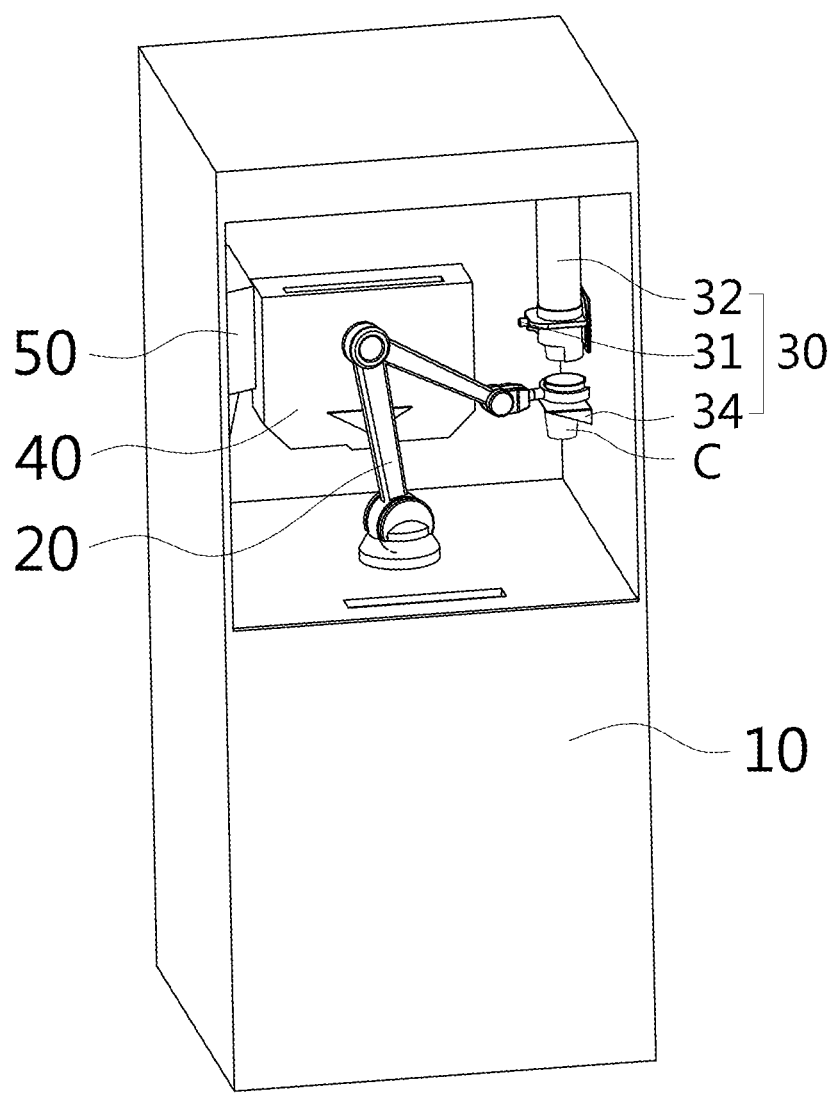
Figure 8:
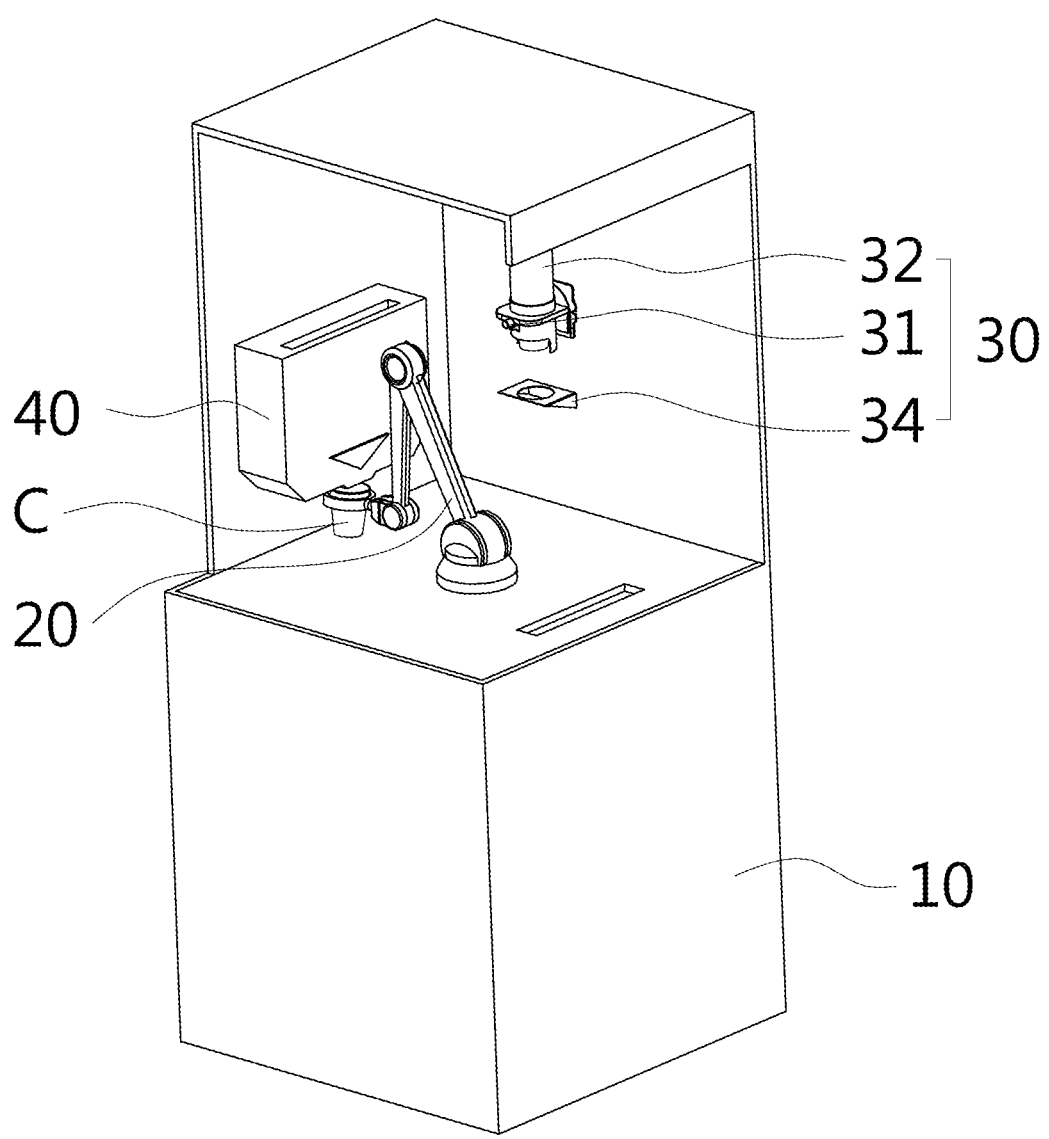
Figure 9:
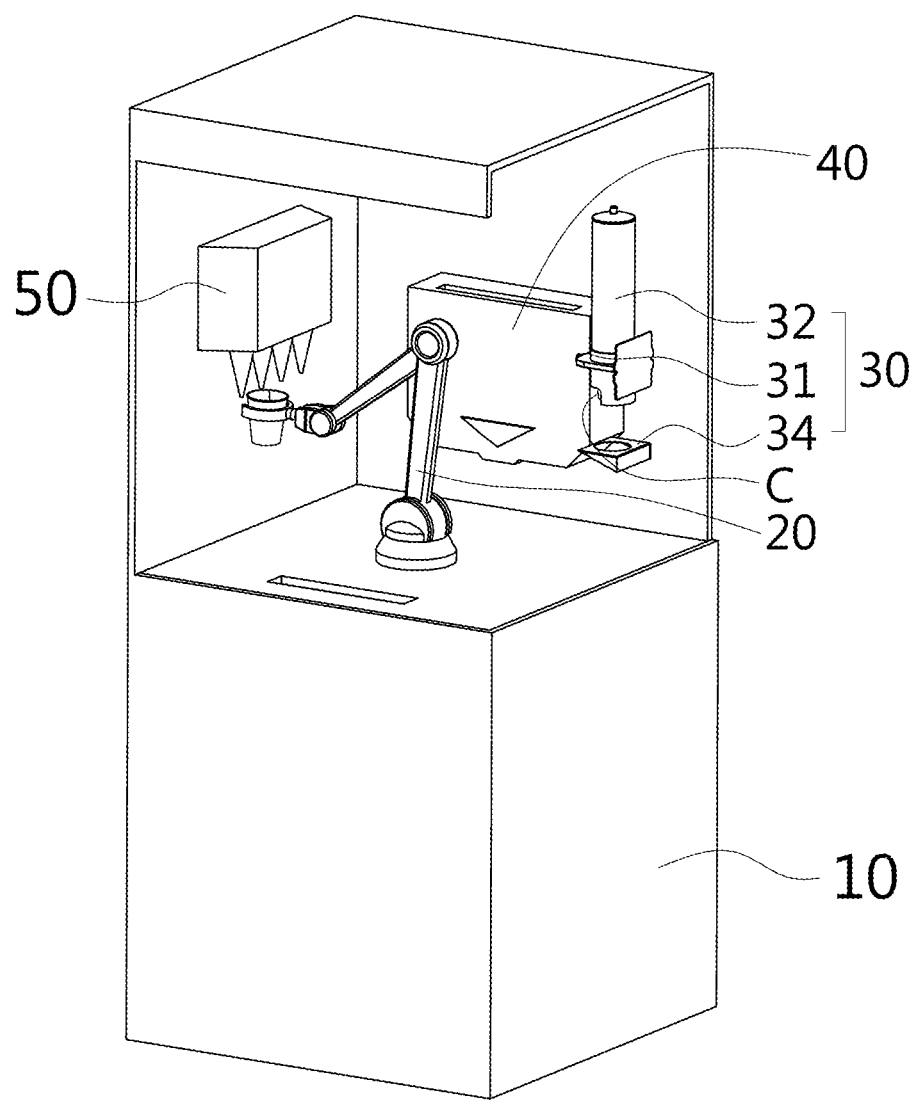

A user selects taste through the operational panel 12, and afterwards inserts coins into the coin-feed mechanism 14. When the amount of coins matches, the robot 20 will move and swing with music for 30-45 seconds, as shown in FIG. 3. Afterwards, as shown in FIG. 4, the robot 20 draws a package 5 from the store space and put the package 5 into the squeezing module 40. Afterwards as shown in FIG. 5, the robot 20 pushes a button 31 of the container module 30, and as shown in FIG. 6, a container C drops from a holder 32 of the container module 30 to a stand 34 under the holder 32. Afterwards as shown in FIG. 7, the robot 20 holds the container C and removes it from the stand 34. As shown in FIG. 8, the robot 20 moves the container C to a position under the squeezing module 40. The squeezing module 40 squeezes the package 5 to move the ice cream out of the squeezing module 40 and flow into the container C. As shown in FIG. 9, the robot 20 moves the container C with the ice cream to a position under the topping module 50, and the topping module 50 releases toppings to the ice cream. The toppings includes nuts, chocolate crisps, peanut powder or colored sugar powder. The ice cream with toppings is transferred to the gate 16 (shown in FIGS. 1 and 2), and the user take the ice cream. The gate 16 is closed in 10 seconds after the user has taken the ice cream. The structure of the squeezing module 40 is described as follows.

Referring to FIGS. 10A-10G, the squeezing module 40 includes a squeezing chamber 41, a first squeezing member 42, a second squeezing member 43, a push rod 44, a plurality of guiding member 45, a plurality of elastic member 46 and a driving device 47.

The squeezing chamber 41 includes an inlet 411 and an outlet 412. The first squeezing member 42 is disposed in front of the second squeezing member 43. The elastic members 46 are disposed between the first squeezing member 42 and the second squeezing member 43 and prop against the first squeezing member 42 and the second squeezing member 43. In this embodiment, the elastic member 46 is a compression spring. The first squeezing member 42 is annular and has a notch 422. The second squeezing member 43 has a head 432 and a main body 434 which is flat. The push rod 44 is connected to the second squeezing member 43. The driving device 47 moves the push rod 44 so as to move the second squeezing module 43. Since the first squeezing module 42 and the second squeezing member 43 are connected by the elastic member 46, the push rod 44 push the first squeezing module 42 and the second squeezing member 43 simultaneously. The first squeezing module 42 and the second squeezing member 43 moves towards the package 5 under the guide of the guiding member 45.

Figure 10A:
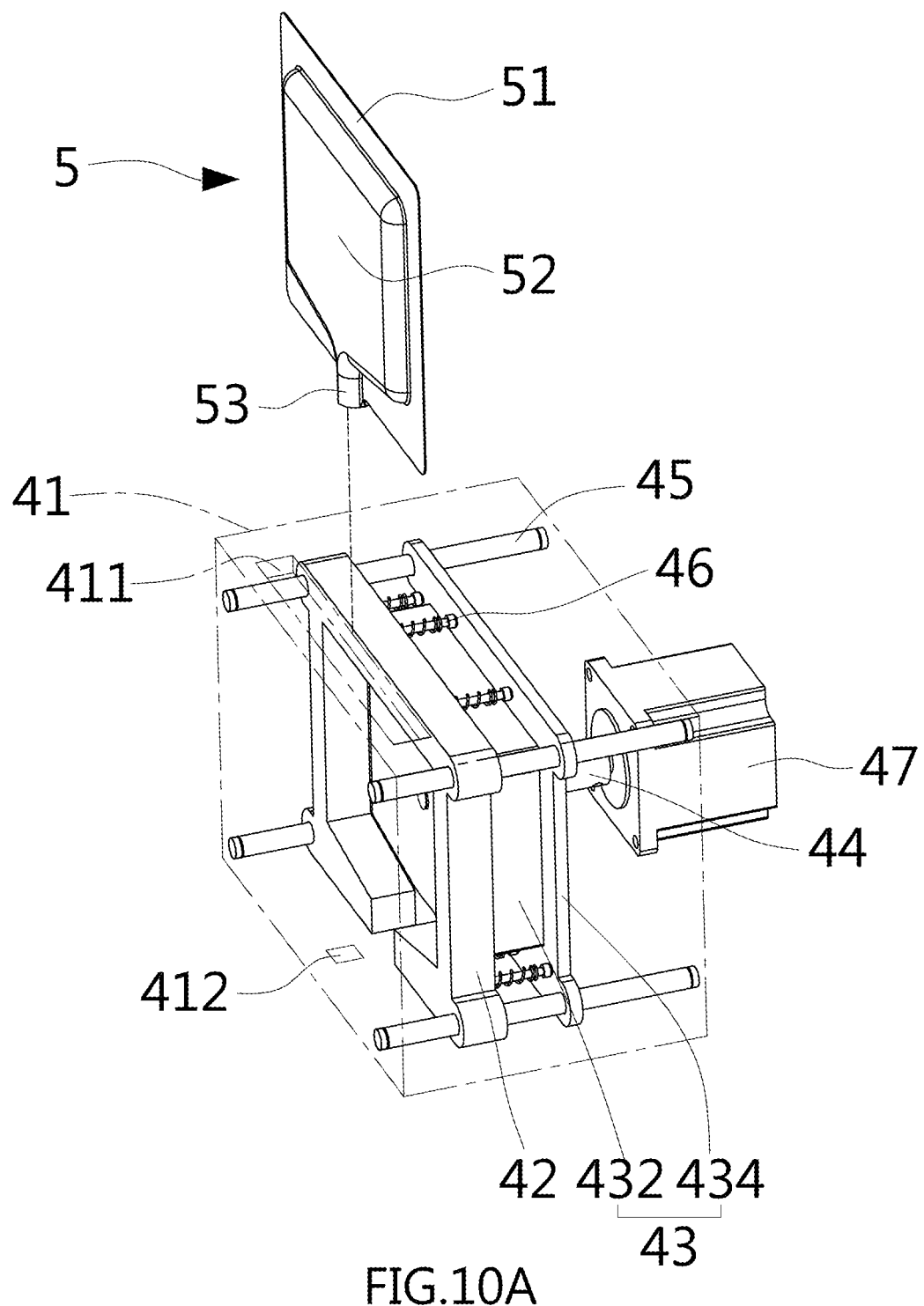
Figure 10B:
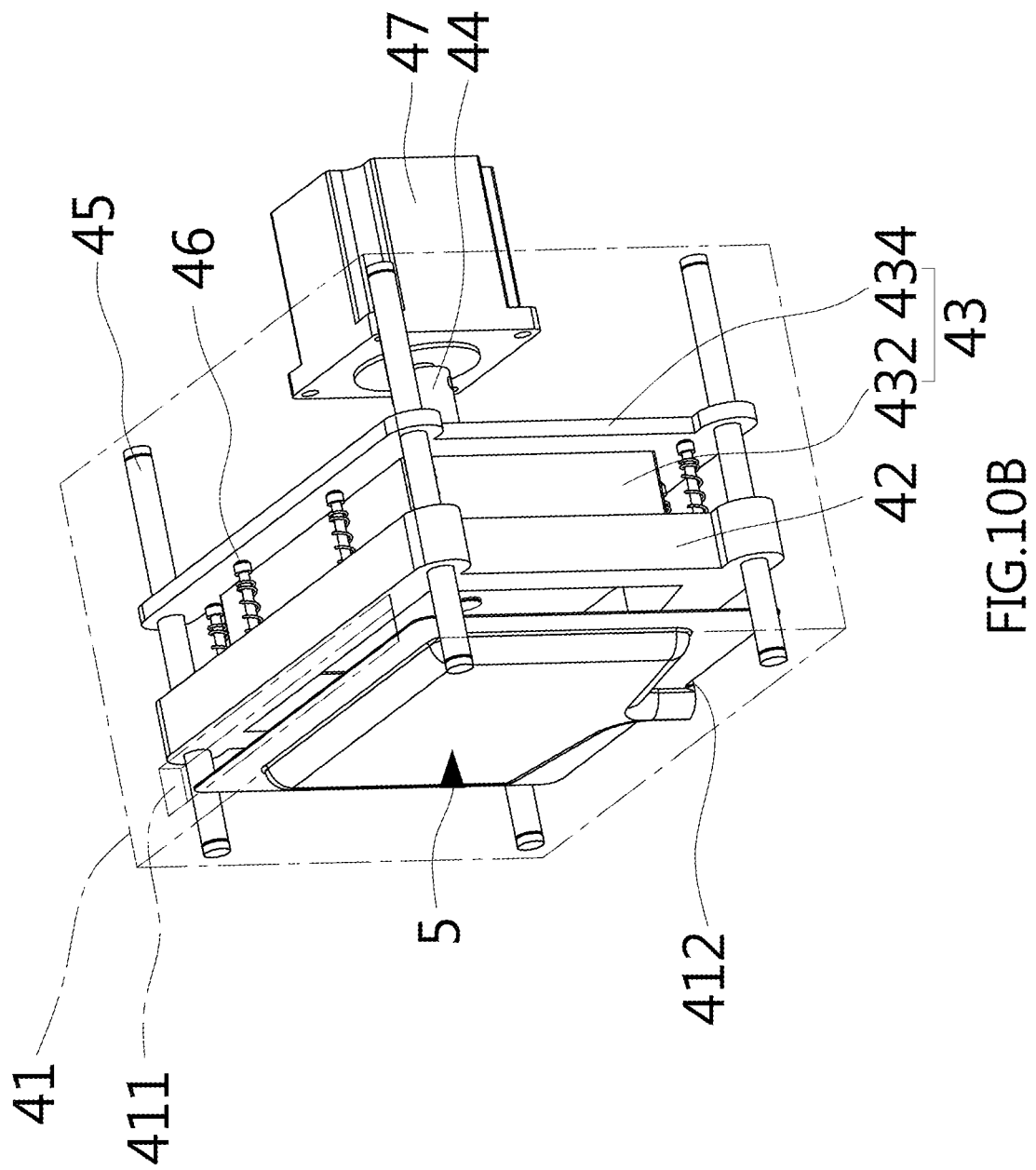
Figure 10D:
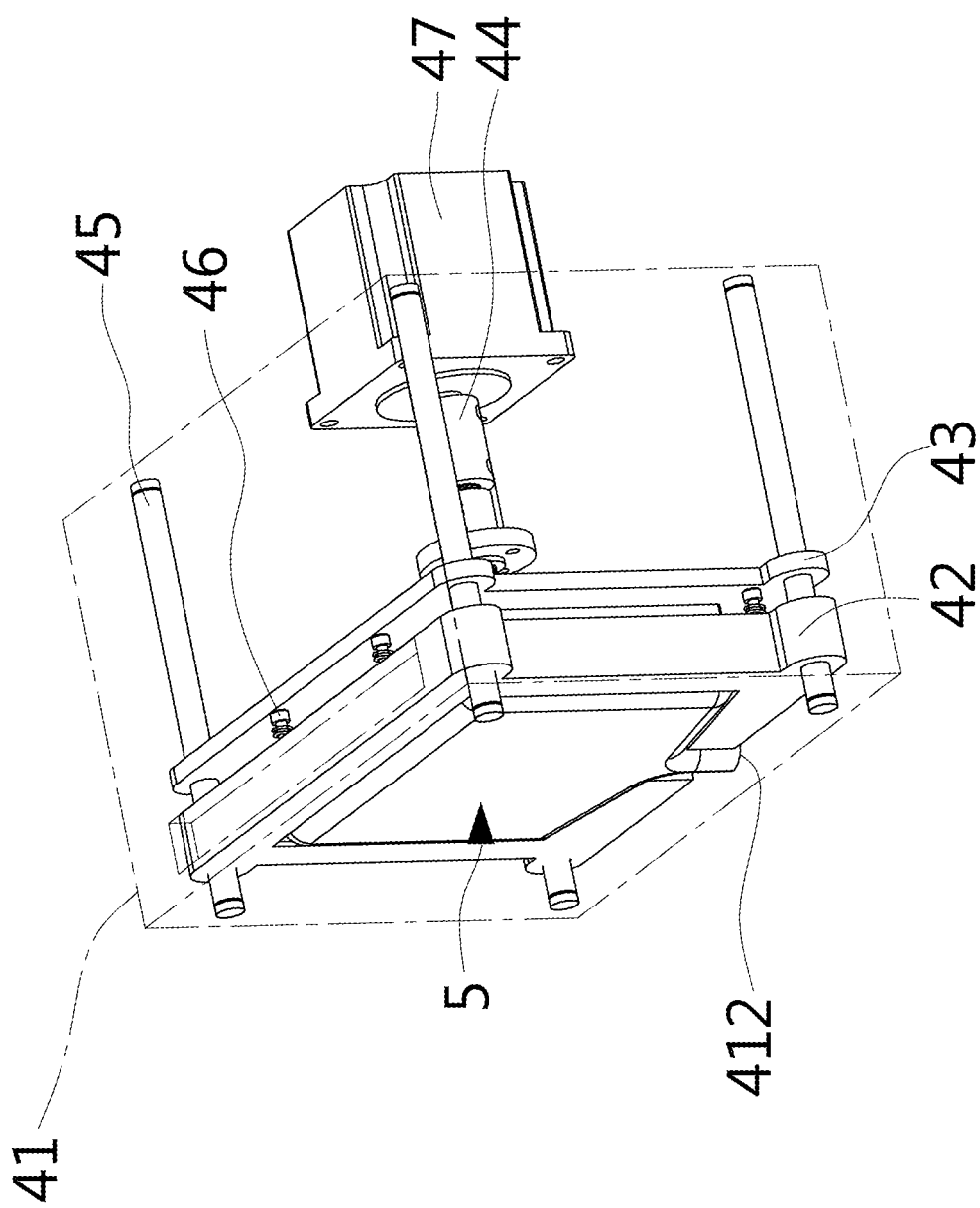

Referring to FIG. 10A, the package 5 has a flange 51 and a main body 52. The flange 51 encloses the main body 52 and has an opening 512 corresponding to an outlet 412 of the squeezing chamber 41. Ice cream is received in the main body 52 of the package 5. The package 5 is transferred into the squeezing chamber 41 and located between a wall of the squeezing chamber 41 and the first squeezing member 42. As shown in FIG. 10B, the driving device 47 moves the push rod 44 so as to move the first squeezing member 42 and the second squeezing member 43. The first squeezing member 42 and the second squeezing member 43 moves towards the package 5 through guidance of the guiding members 45. As shown in FIG. 10C, the first squeezing member 42 presses the flange 51 to position the package 5 in the squeezing chamber 41. At this time, the opening 53 of the package 5 corresponds to the notch 422 of the first squeezing member 42 and the outlet 412 of the squeezing chamber 41. As shown in FIG. 10D, the push rod 44 continues to move the second squeezing member 43. The head 432 moves to pass through the first squeezing member 42 and squeeze the main body 52 of the package 5. The ice cream in the main body 52 flows out of the squeezing chamber 41 through the opening 53 and the outlet 412.

The head 432 is made of soft material such as rubber and has a squeezing surface facing the package 5. The squeezing surface is an inclined surface in this embodiment. When the head 432 squeezes the main body 52 of the package 5, the inclined surface (squeezing surface) presses the main body 52 from the top down to squeeze the ice cream out of the package 5 through the opening 53.

Figure 10E:
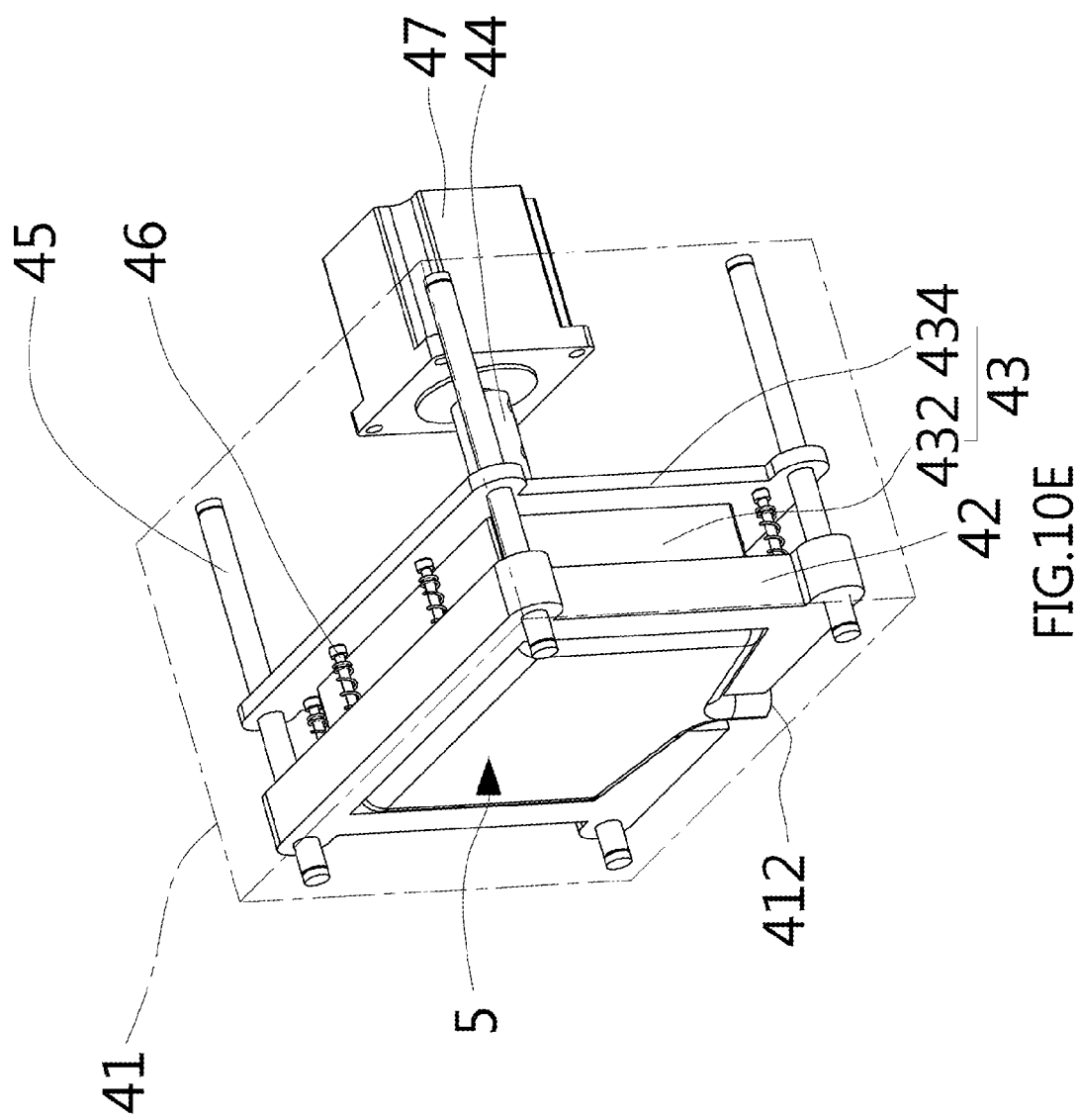
Figure 10F:
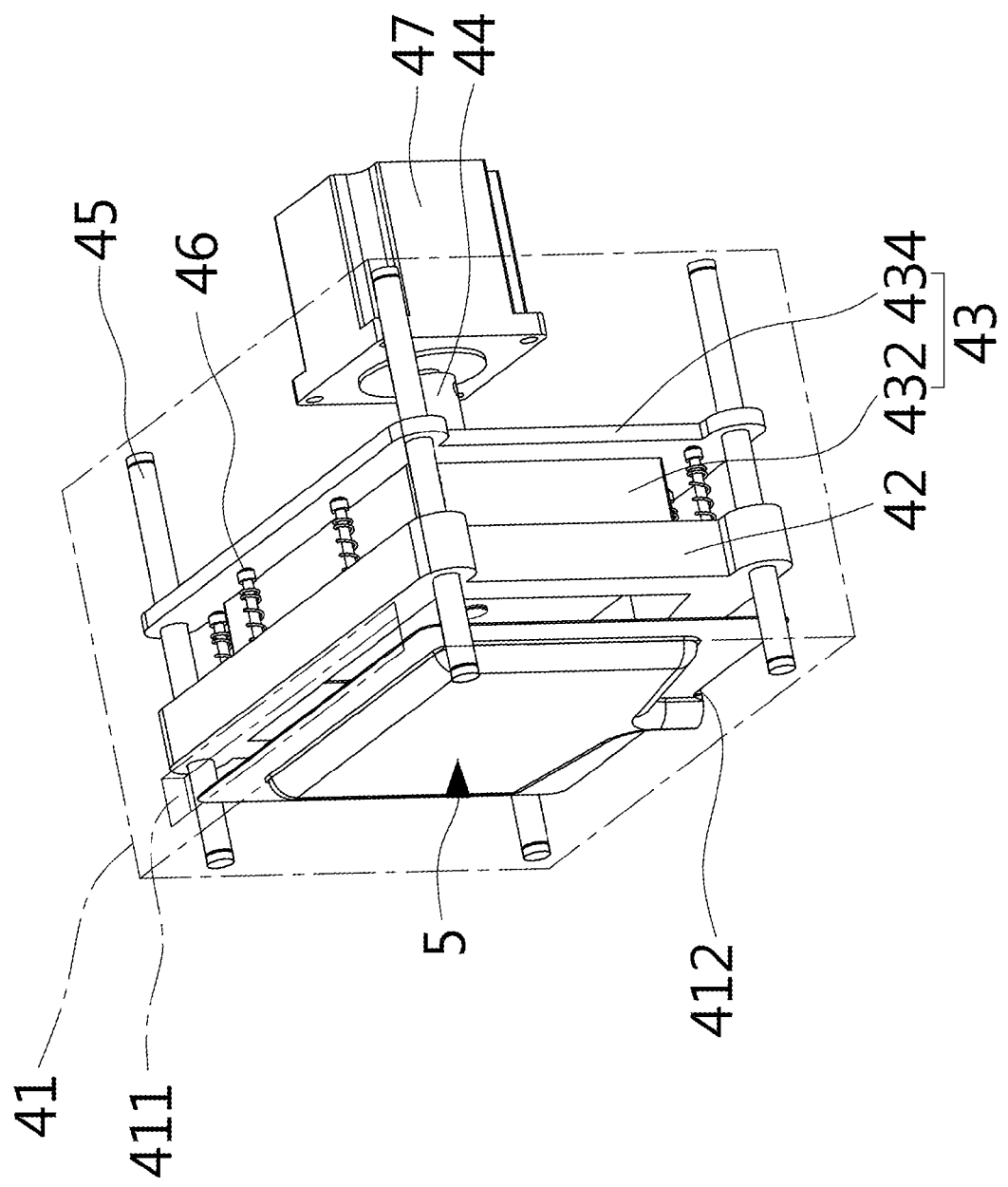
Figure 10G:
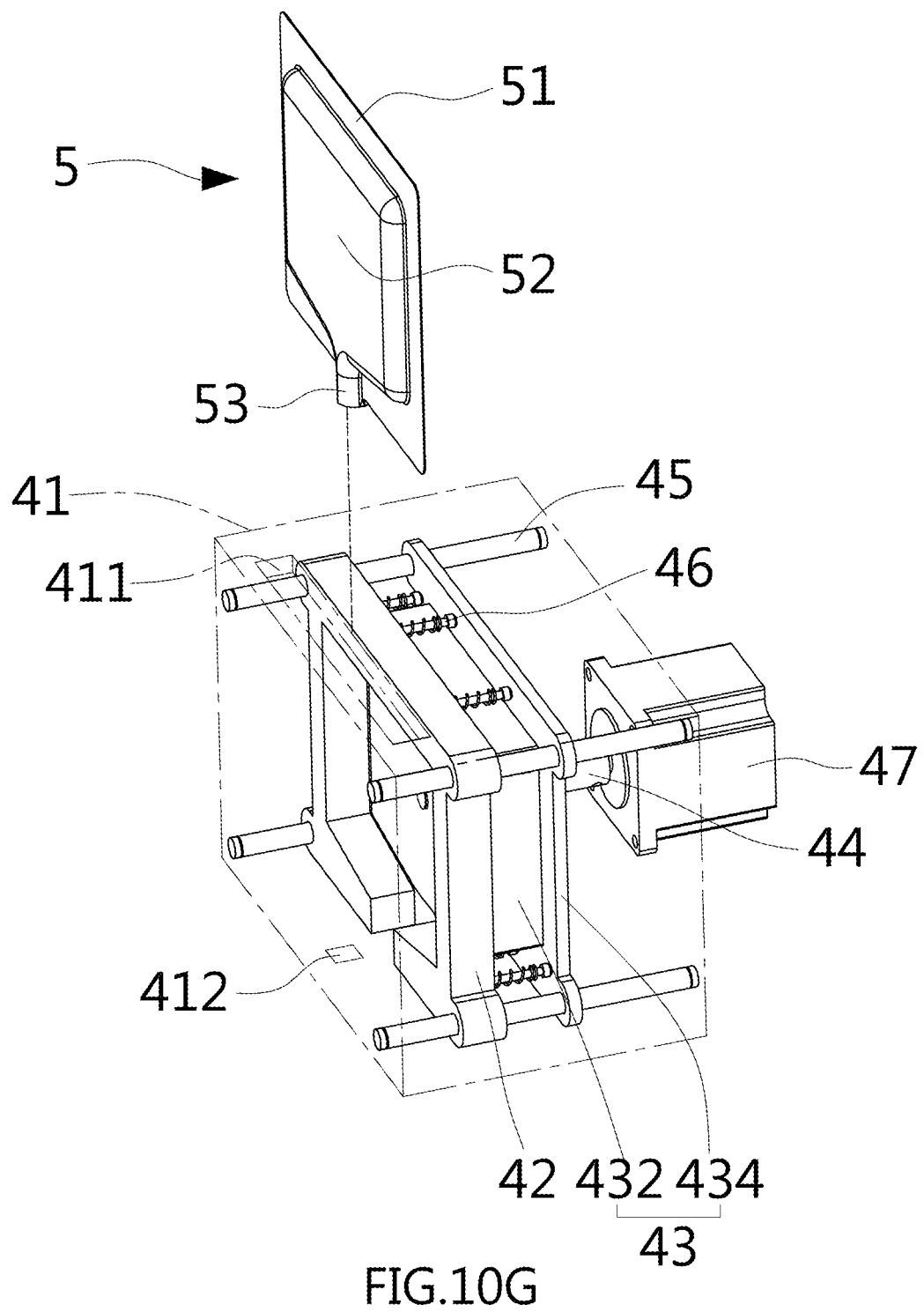

As shown in FIG. 10E, the push rod 44 moves back so as to move the second squeezing member 43 back as shown in FIG. 10F and move the first squeezing member 42 back as shown in FIG. 10G. The package 5 from which the ice cream has been squeezed out is drawn out of the squeezing chamber 41.

The ice cream squeezing device of the invention includes the robot 20 which automatically transfers the package 5 to the squeezing module 40. The user needs only to push button and wait the ice cream.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A ice cream squeezing device, comprising:
   a robot;
   a storage space accommodating a plurality of packages receiving ice cream; and
   a squeezing module squeezing one of the packages transferred by the robot from the storage space to the squeezing module to move the ice cream out of the package.

2. The ice cream squeezing device as claimed in claim 1 further comprising a container module accommodating a plurality of containers, wherein the robot takes a container from the container module to receive the ice cream squeezed out by the squeezing module.

3. The ice cream squeezing device as claimed in claim 2 further comprising a topping module, wherein the robot moves the container filled with the ice cream to the topping module, and the topping module adds toppings to the ice cream.

4. The ice cream squeezing device as claimed in claim 2, wherein the container module comprises a holder holding the container and a button disposed on the holder, a container drops from the holder when the button is pushed.

5. The ice cream squeezing device as claimed in claim 1, wherein the package comprises a main body receiving the ice cream and a flange, and the squeezing module comprises:
   a squeezing chamber having an outlet and an inlet through which the package is transferred to the squeezing chamber;
   a first squeezing member movably disposed in the squeezing chamber and pressing the flange of the package so as to position the package; and
   a second squeezing member movably disposed in the squeezing chamber and pressing the main body to squeeze the ice cream out of the package and the squeezing chamber.

6. The ice cream squeezing device as claimed in claim 5, wherein the squeezing module further comprises:
   a push rod moving the first squeezing member and the second squeezing member;
   a driving device moving the push rod;
   at least one guiding member guiding the first squeezing member and the second squeezing member when the first squeezing member and the second squeezing member moves in the squeezing chamber; and
   at least one elastic member disposed between the first squeezing member and the second squeezing member, wherein the first squeezing member is closer to the package than the second the squeezing member.

7. The ice cream squeezing device as claimed in claim 6, wherein the driving device is a motor.

8. The ice cream squeezing device as claimed in claim 5, wherein the first squeezing member is annular and has an inner periphery, and the second squeezing member has a head capable of moving through the first squeezing member.

9. The ice cream squeezing device as claimed in claim 8, wherein the head has a squeezing surface configured to face the package, and the squeezing surface is an inclined surface.

10. The ice cream squeezing device as claimed in claim 5, wherein the package has an opening, and the first squeezing member has a notch, and the opening corresponds to the notch when the first squeezing member presses the flange.

\* \* \* \* \*